Figure 5:
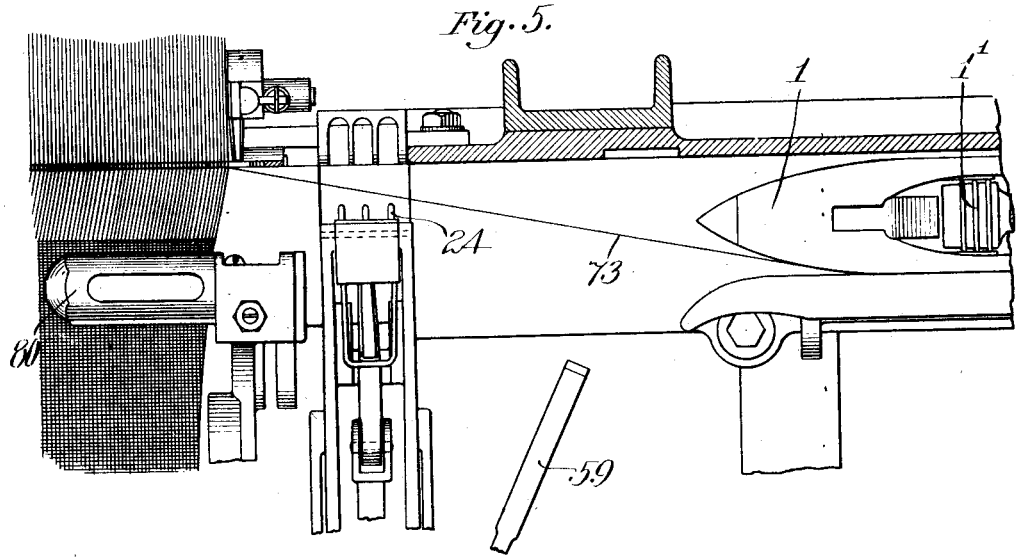

F. A. MILLS.
THREAD PARTING MECHANISM FOR FILLING REPLENISHING LOOMS.
APPLICATION FILED JULY 3, 1906.
1,119,186.
Patented Dec. 1, 1914.
9 SHEETS—SHEET 1.
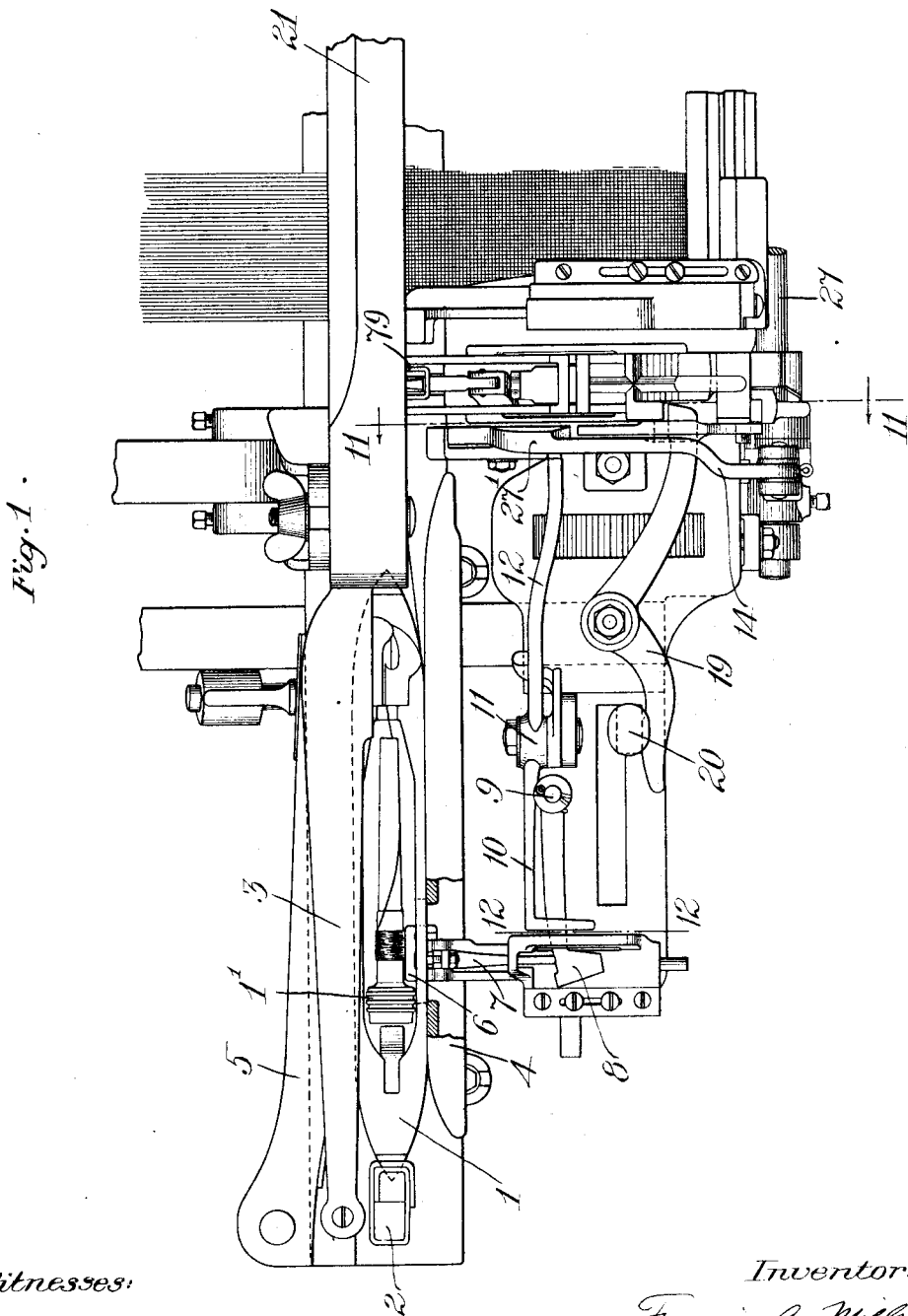
Witnesses:
Irving U. Townsend.
Robert H. Hammler.
Inventor:
Francis A. Mills
By Emery and Booth
his Attorneys.

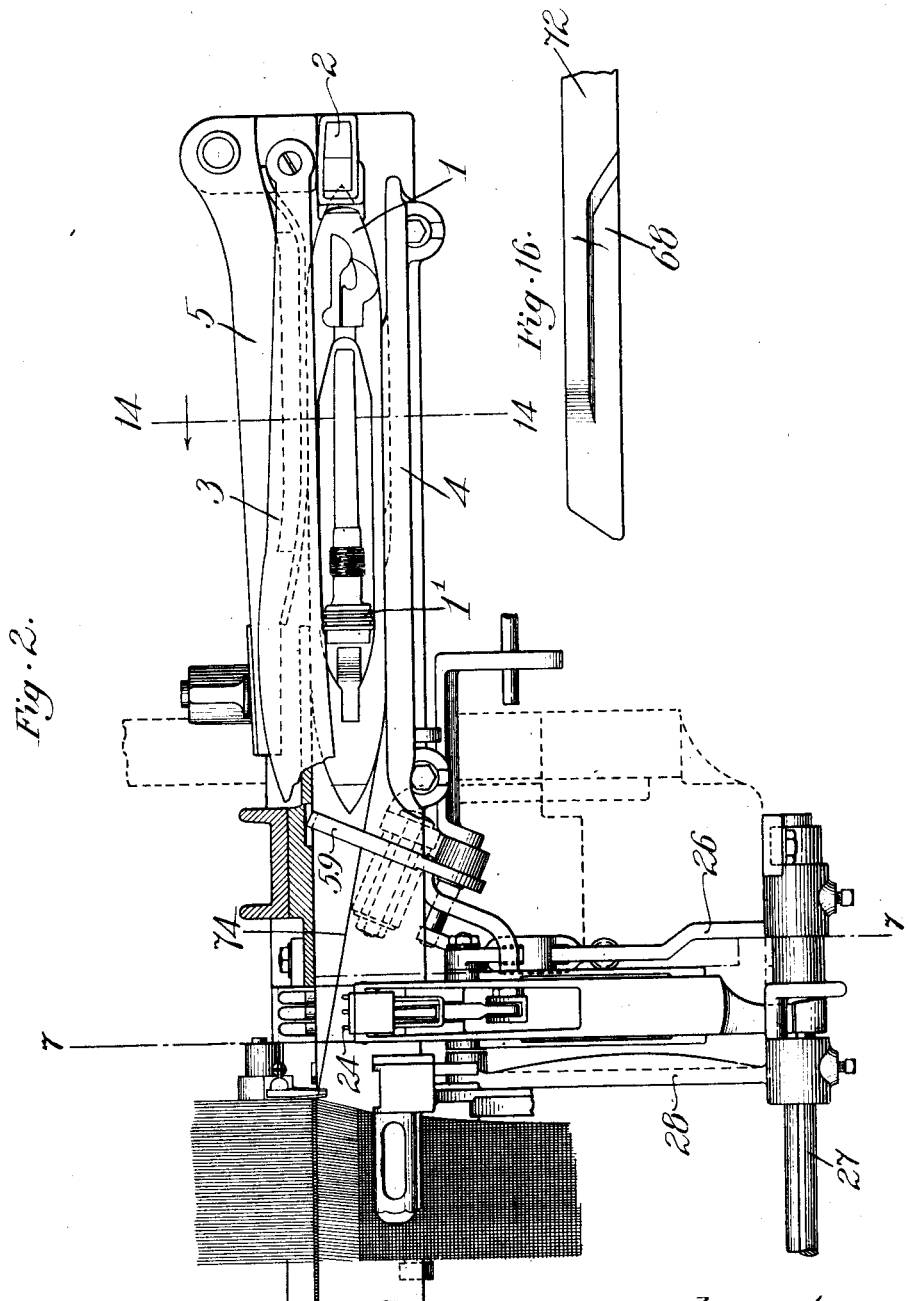

F. A. MILLS.
THREAD PARTING MECHANISM FOR FILLING REPLENISHING LOOMS.
APPLICATION FILED JULY 3, 1906.
1,119,186.
Patented Dec. 1, 1914.
9 SHEETS—SHEET 3.
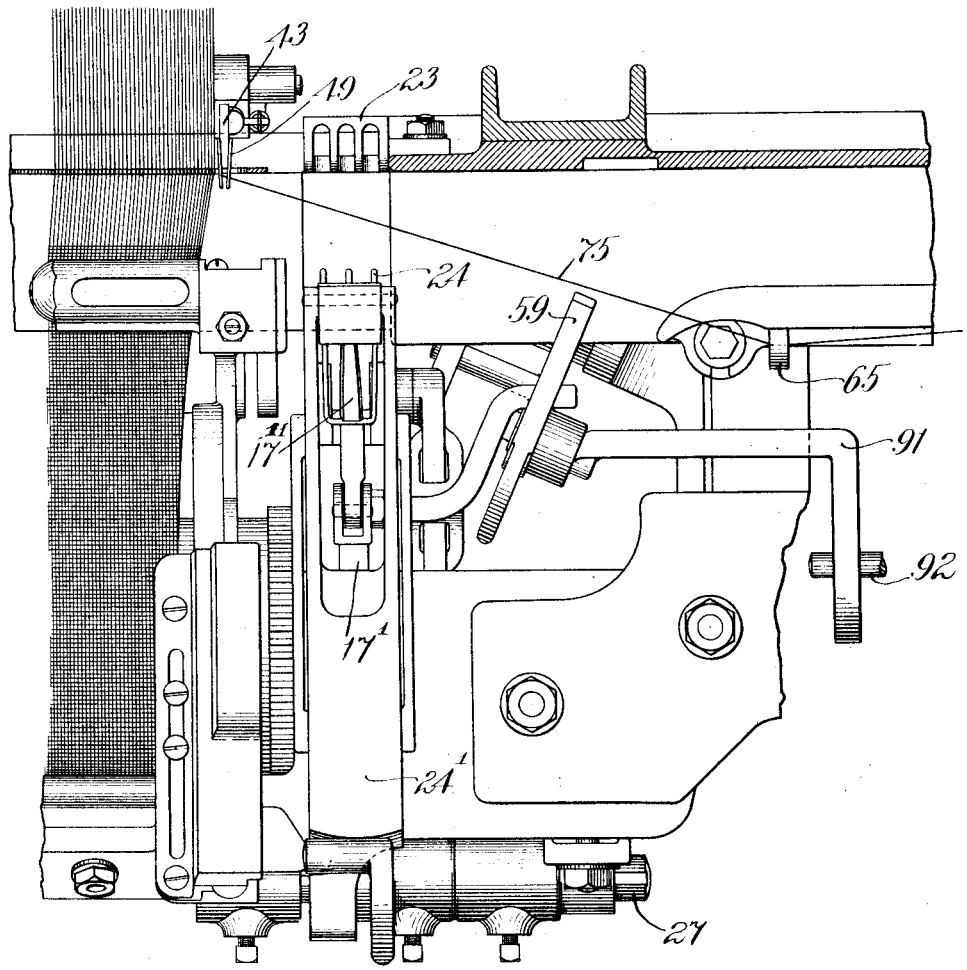
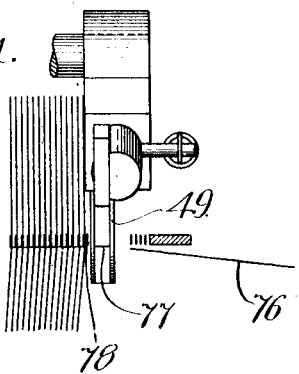

F. A. MILLS.
THREAD PARTING MECHANISM FOR FILLING REPLENISHING LOOMS.
APPLICATION FILED JULY 3, 1906.

1,119,186.

Patented Dec. 1, 1914.
9 SHEETS—SHEET 4.

Witnesses:
Irving U. Townsend.
Robert H. Kammler.

Inventor.
Francis A. Mills
By Emery and Booth
his Attorneys.

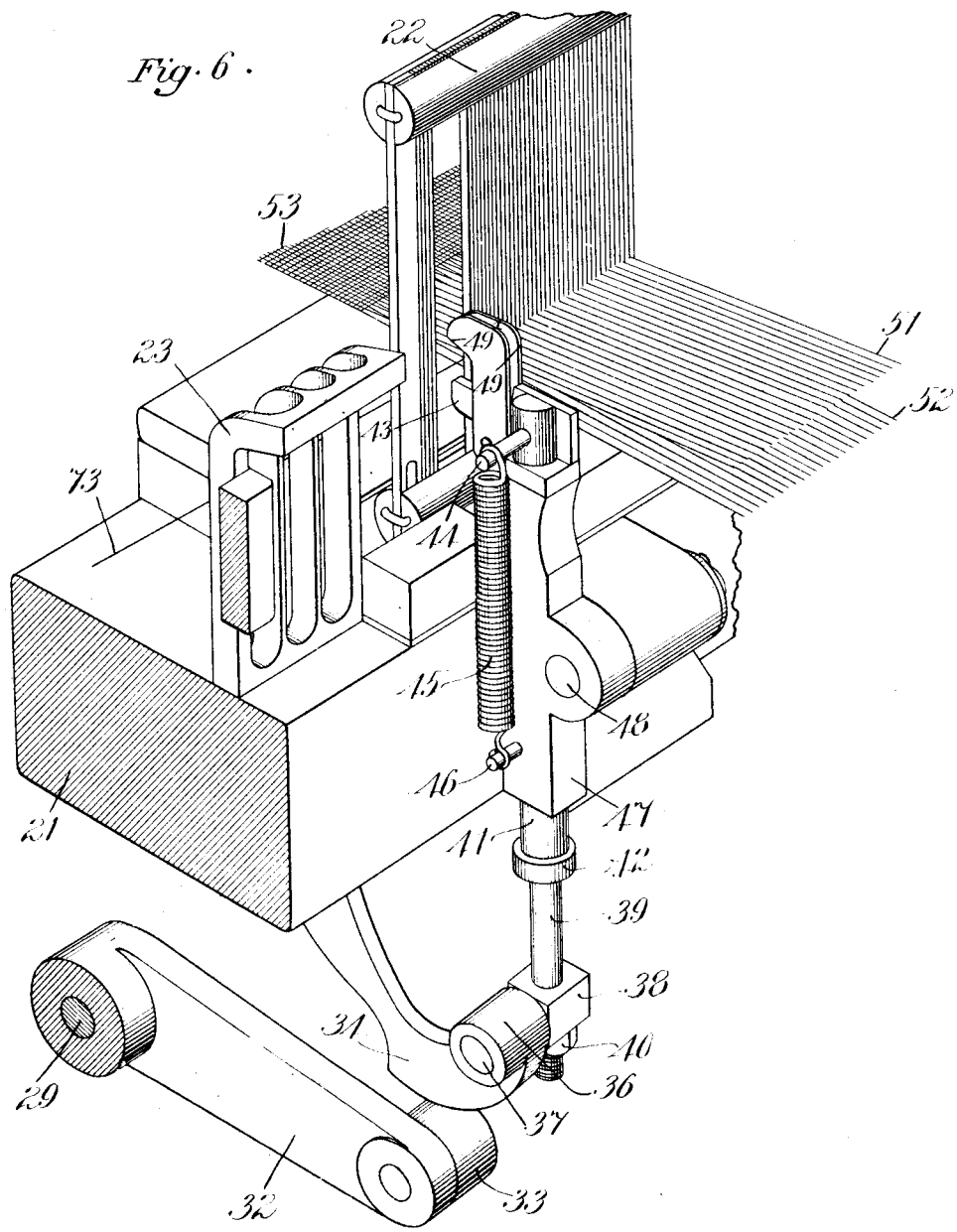

F. A. MILLS.
THREAD PARTING MECHANISM FOR FILLING REPLENISHING LOOMS.
APPLICATION FILED JULY 3, 1906.

1,119,186.

Patented Dec. 1, 1914.
9 SHEETS—SHEET 6.

Witnesses:
Irving W. Townsend.
Robert H. Kammler.

Inventor:
Francis A. Mills
By Emery and Booth
his Attorneys

F. A. MILLS.
THREAD PARTING MECHANISM FOR FILLING REPLENISHING LOOMS.
APPLICATION FILED JULY 3, 1906.

1,119,186.

Patented Dec. 1, 1914.
9 SHEETS—SHEET 7.

F. A. MILLS.
THREAD PARTING MECHANISM FOR FILLING REPLENISHING LOOMS.
APPLICATION FILED JULY 3, 1906.

1,119,186.

Patented Dec. 1, 1914.
9 SHEETS—SHEET 8.

Witnesses:
Irving U. Townsend
Robert H. Kammler

Inventor:
Francis A. Mills
By Emery and Booth
his Attorneys.

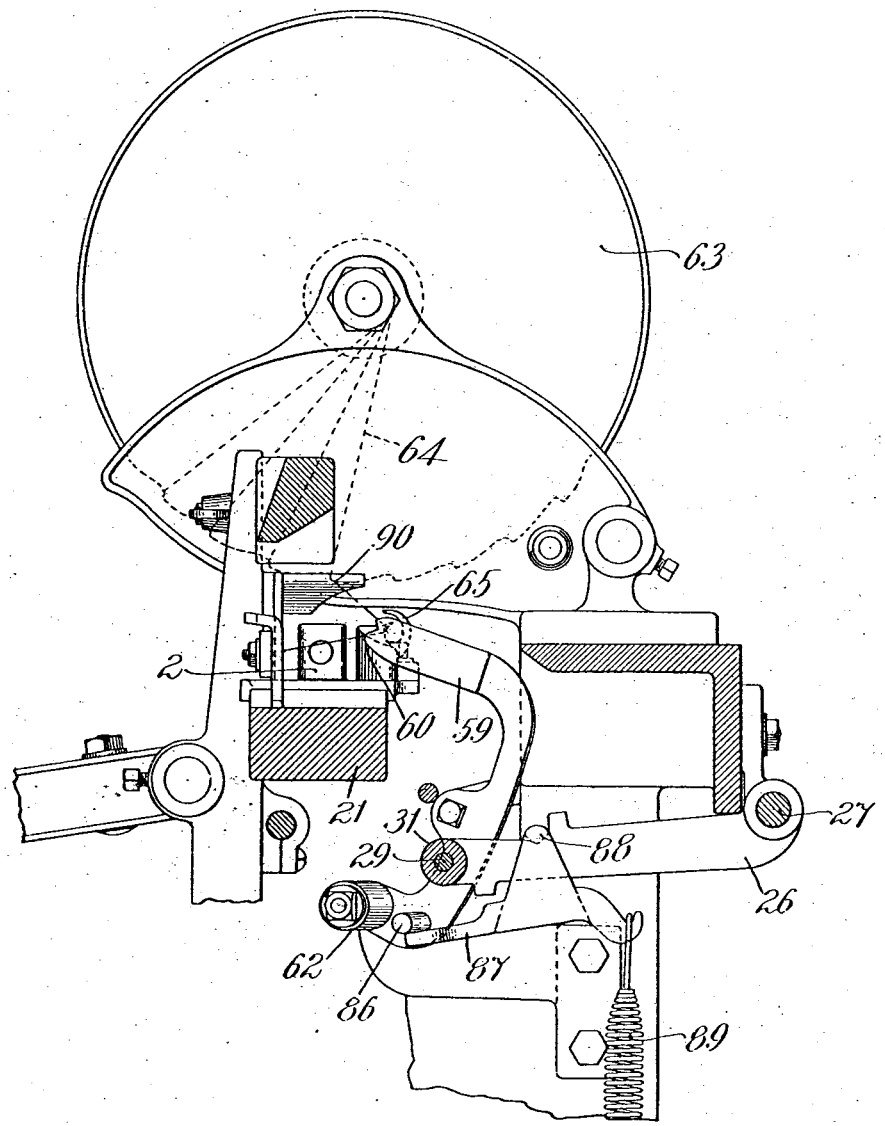

UNITED STATES PATENT OFFICE.

FRANCIS A. MILLS, OF LAWRENCE, MASSACHUSETTS, ASSIGNOR TO DRAPER COMPANY, OF HOPEDALE, MASSACHUSETTS, A CORPORATION OF MAINE.

THREAD-PARTING MECHANISM FOR FILLING-REPLENISHING LOOMS.

1,119,186. Specification of Letters Patent. Patented Dec. 1, 1914.

Application filed July 3, 1906. Serial No. 324,670.

*To all whom it may concern:*

Be it known that I, FRANCIS A. MILLS, a citizen of the United States, residing at Lawrence, in the county of Essex and State of Massachusetts, have invented an Improvement in Thread-Parting Mechanism for Filling-Replenishing Looms, of which the following description, in connection with the accompanying drawings, is a specification, like letters on the drawings representing like parts.

This invention relates primarily to filling replenishing looms, although certain features thereof are not restricted to a filling replenishing loom.

I have chosen to represent my improvements applied to a filling replenishing loom of the type wherein the bobbin is replenished upon substantial exhaustion of filling in the running shuttle but I wish it to be clearly understood that it is within the scope of my invention to employ a filling replenishing mechanism wherein a fresh shuttle, having a supply of filling therein, is substituted for the running shuttle either upon substantial exhaustion or upon filling failure, or that I may employ weft carriers or cases within a shuttle, a weft carrier or case being ejected from the running shuttle and another substituted therefor upon substantial exhaustion of the filling or upon complete failure thereof.

It is also within the scope of my invention to employ a bobbin replenishing loom operative upon the entire absence of filling instead or upon substantial exhaustion thereof.

Inasmuch as these several types of filling replenishing mechanisms are well-known, it is unnecessary for me to illustrate more than the one type shown, which, as before stated, presents merely one practical embodiment of my invention.

My invention particularly relates to means for severing or cutting the filling pertaining to the bobbin that is to be ejected, if this type of replenishing mechanism be employed, and to means for severing or cutting the filling pertaining to the new bobbin with which the shuttle is replenished in this type of replenishing mechanism. While I employ the same severing device to sever the old and the new filling, in certain aspects of my invention I am not limited to the employment of the same device to sever both fillings, nor am I limited in certain aspects of my invention to any location of such severing device, although I preferably mount the same upon the lay of the loom and preferably in the rear of the reed, or in the rear of the plane of the front face of the reed, that is to say, in the rear of the path of the shuttle.

While the specific embodiment of thread severing means here shown is a thread cutter, I am not limited thereto, as any other type of thread severing mechanism may be employed so far as certain features are concerned. I have also chosen to illustrate my invention as pertaining to that type of loom wherein a weft fork or filling indicator is employed upon each side of the loom and I have chosen in certain aspects of my invention to employ the auxiliary weft fork (being that weft ork which is upon the replenishing side of the loom) to operate the cutter or filling seve ing means under certain conditions, but in other aspects of my invention I am not lim ted to the use of such auxiliary weft fork or fillin indicator.

A primary feature of my in ention is to so sever the old and the new filling, or either of them, essentially at the selvage, that after the severance of said ends the end of the filling contained within the fabric is not exposed or is not essentially exposed beyond the selvage.

I am enabled by my invention to dispense with the retrimming of the fabric produced in weft replenishing looms which heretofore it has been impossible to dispense with, owing to the fact that the filling was severed at such a distance from the selvage that the latter presented an unsightly appearance. I am also enabled to prevent the formation of "slugs," caused by the drawing into the shed on the succeeding pick, of the short end of the old or new filling that was cut at a substantial distance beyond the selvage.

Figure 12:
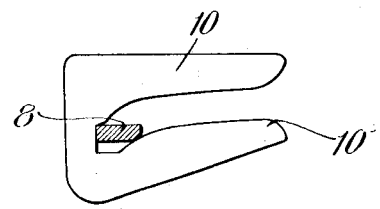
Figure 7:
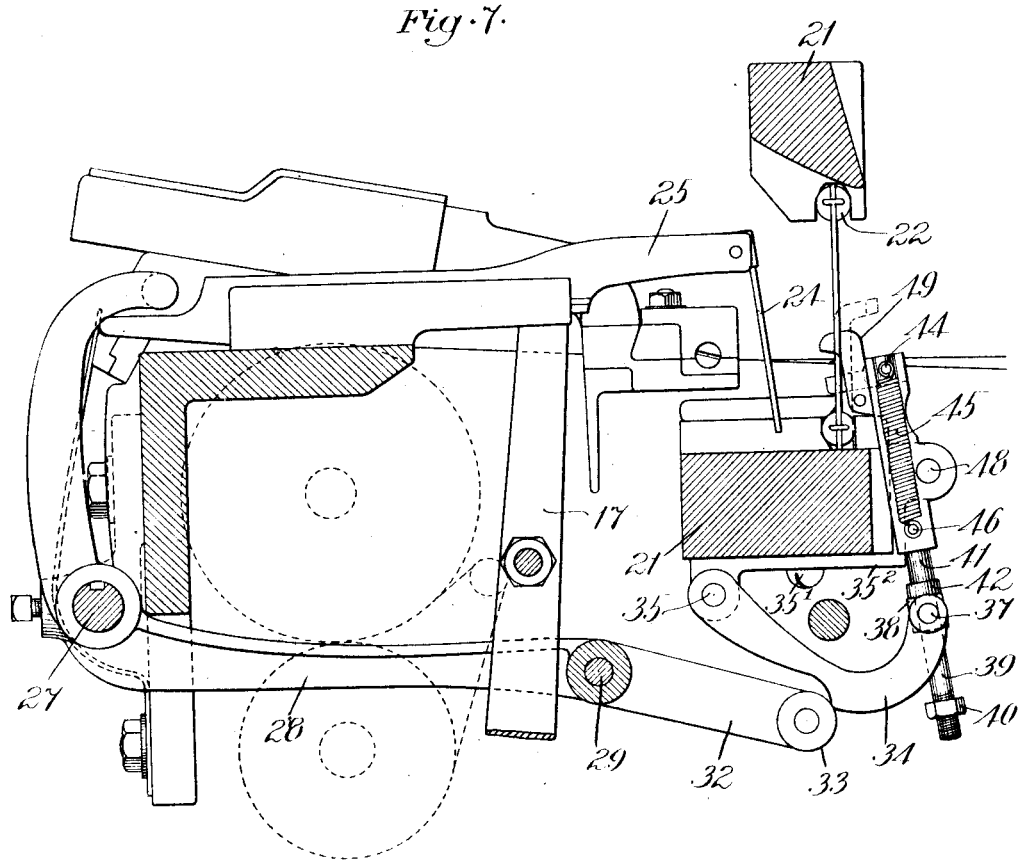
Figure 8:
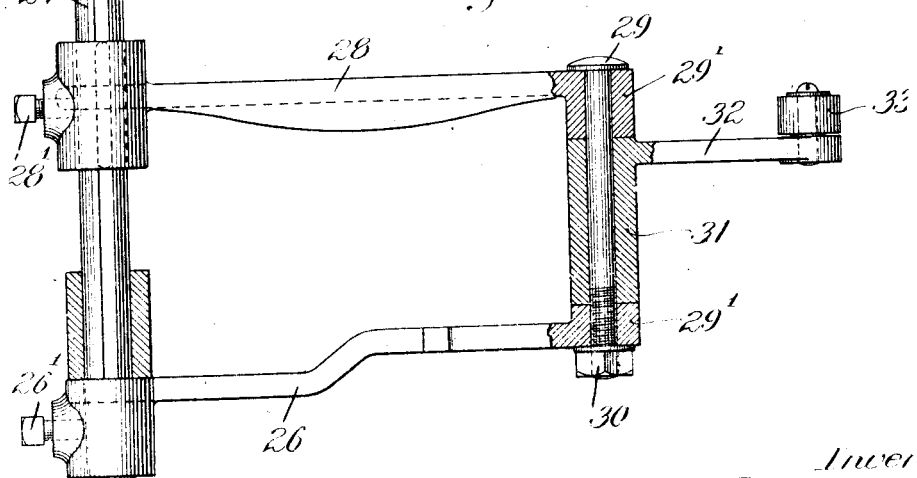
Figure 10:
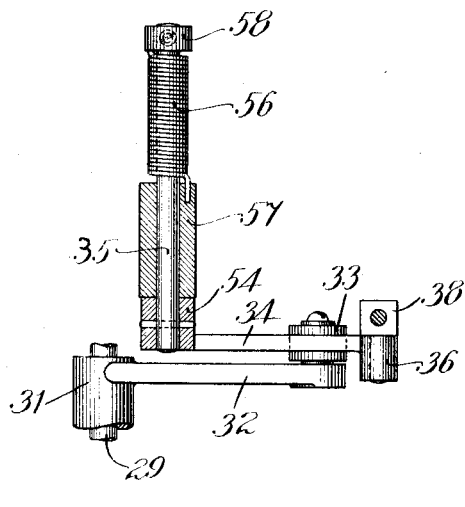
Figure 9:
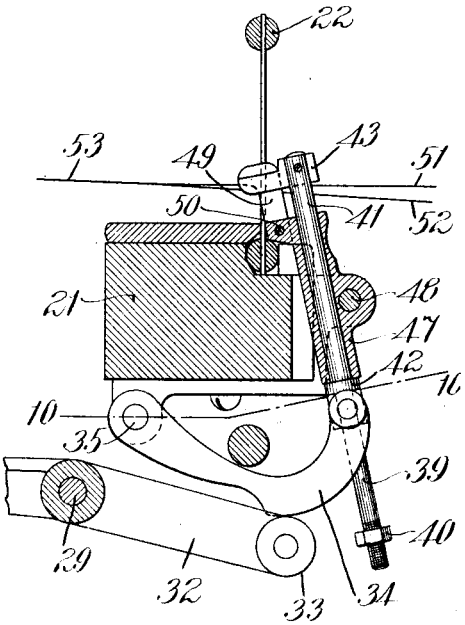
Figure 15:
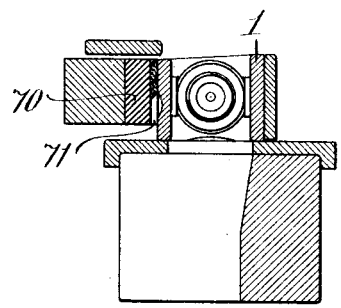
Figure 11:
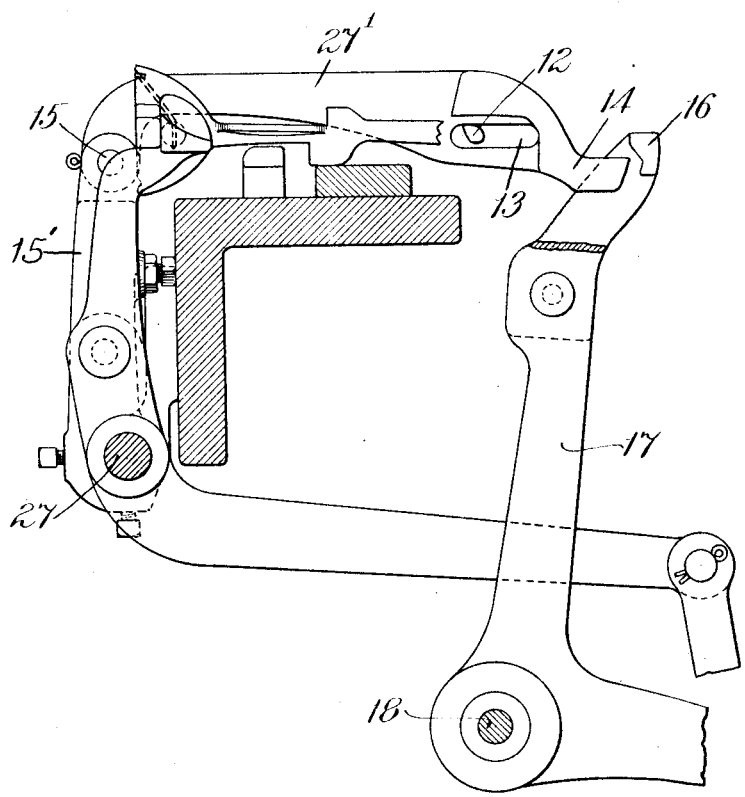
Figure 14:
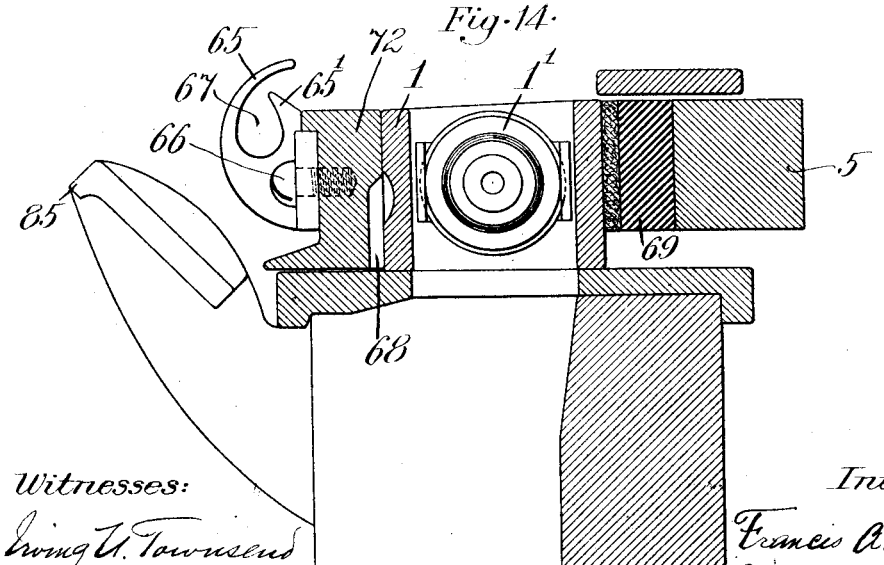

In the drawings: Figure 1 is a plan showing that side of the loom wherein substantial exhaustion of the filling is indicated, the parts being represented in the indicating position; Fig. 2 is a plan showing a portion of the opposite or replenishment side of the loom with the parts in position to cut the old filling that is to be ejected; Fig. 3 is a plan on an enlarged scale of a portion of that side of the loom whereat replenishment occurs, the parts being in the position to sever the new filling; Fig. 4 is a detail showing the severing of the filling; Fig. 5 is a plan of a portion of a loom at the filling replenishing side thereof, showing the normal running position; Fig. 6 is a cross section through the lay, showing the cutter in its normal or inoperative position, many of the parts being shown in elevation; Fig. 7 is a vertical section through the loom from front to rear, on line 7—7 of Fig. 2 looking to the left, showing the cutter in readiness to cut; Fig. 8 is a detail showing in plan the transfer shaft of the replenishing mechanism and the cutter operating means connected therewith; Fig. 9 is a cross section through the lay representing the cutter as having just severed a thread; Fig. 10 is a detail of the operating levers for the cutter and connected parts, upon the line 10—10 of Fig. 9; Fig. 11 is a cross section upon the line 11—11 of Fig. 1, looking to the left and representing the indication as having just occurred; Fig. 12 is a detail upon the line 12—12 of Fig. 1; Fig. 13 is a vertical section of the loom, on line 7—7 of Fig. 2 looking to the right, showing a portion of the hopper of the weft replenishing mechanism and the position of the filling with relation to the running parts of the loom; Fig. 14 is a cross section of the shuttle box and shuttle showing the thread guide or holder and the cut out or recessed wall of the shuttle box, such section being taken on the line 14—14 of Fig. 2, looking to the right; Fig. 15 is a similar view upon a smaller scale, but showing the binder at the front and recessed or cut away; and Fig. 16 is a detail showing inverted a part of the shuttle box wall or binder as the case may be having a portion thereof recessed or cut away.

Referring more particularly to Figs. 1 and 2, in the drawings: 1 indicates a shuttle of any preferred type, having a bobbin 1' therein; 2 represents the pickers; 3 represents the shuttle guards; 4 represents the shuttle base plate; 5 represents the shuttle binders; and 6 represents the feeler of any desired type adapted to feel within the shuttle and to indicate substantial exhaustion thereof in any preferred manner. 7 indicates a portion of the feeler adapted, when substantial exhaustion occurs, to impinge upon the lever 8 (preferably spring pressed), pivoted at 9, and to move the same outwardly or to the right, viewing Fig. 12, to thereby depress the adjacent end of the lever or detent 10, provided for that purpose with the slot 10' therein. Said lever 10 is pivoted as indicated at 11 and the end of the opposite arm 12 thereof extends within a slot 13 of the lever 27' of the replenishing mechanism, as shown in Fig. 11, to thereby lift the same into the path of the projection 16 upon the weft hammer 17, pivoted at 18, and operated in any usual manner so that in the motion thereof to the left, viewing Fig. 11, the lever 27' will be moved bodily in the same direction. Said arm 27' is pivoted at 15 to the lever 15' (see Fig. 11) mounted upon the transfer shaft 27 of the replenishing mechanism. Through the described connections the transfer shaft 27 is rocked when substantial exhaustion of the filling in the running shuttle occurs and thereby through any usual or preferred mechanism the bobbin in the running shuttle is ejected and a new bobbin substituted therefor. While I have described in detail one method of operating the illustrated type of replenishing mechanism, it is to be, of course, understood that I am not limited to such form of mechanism but that the replenishing mechanism may be operated in any desired manner upon filling failure or upon substantial exhaustion of the filling. At the replenishment side of the loom is provided the transfer lever 26, splined upon the transfer shaft 27 and adjustably secured thereon, as by a set screw 26'. Also splined upon said transfer shaft is a lever 28, said lever being capable of longitudinal adjustment upon said shaft and adapted to be held in the desired position of adjustment as by the set screw 28'. For convenience of description I have herein designated said lever as the primary lever for the cutter. Said transfer lever and primary lever extend essentially parallel and toward the lay and are united at their forward ends by a bolt 29, passed through hubs 29' of said levers and having at its other or screw-threaded end a nut 30. Between the hubs 29', 29' is mounted a sleeve 31, having an arm 32 provided, if desired, with a roller 33 thereon, said arm 32 forming in effect an extension of the lever 28. It will be seen that the levers 26 and 28 are by the described construction rigidly united. Inasmuch, however as it is desirable to mount the filling cutt.. at the selvage or substantially thereat and to aline therewith the operating means therefor, it becomes necessary, when weaving narrower goods, to shift the primary lever 28 for the cutter longitudinally upon the transfer shaft 27 to aline the same with the new position of the filling cutter. To do this, the nut 30 is removed and the lever 28 is moved to the desired position of adjustment, preferably leaving the transfer lever 26 in the position shown. The nut 30 will then be replaced upon the exposed end of the bolt 29 so as to clamp the sleeve 31 against the hub 29' of the primary lever 28.

As previously stated, I mount the cutter for the filling close to the selvage, or it may be mounted in contact therewith, so that after the severance of the filling, whether new or old, essentially no exposed end of the filling is left at the selvage, the end 78 of the filling within the shed withdrawing into the cloth owing to the beating up action of the lay so as to leave essentially no exposed portion and to be essentially flush with said selvage. The relation of the end of the filling within the shed to the selvage is substantially illustrated in Fig. 4, wherein it will be observed that essentially no projecting end is exposed at the selvage. In using the expression "essentially no projecting end is exposed at the selvage," I intend to indicate a condition of affairs wherein the selvage is by the action of the cutter rendered essentially free from exposed ends or, in other words, a condition wherein the selvage does not need retrimming. In certain aspects of my invention, I am not however, limited to cutting or severing the filling at or essentially at the selvage.

In the present embodiment of my invention the filling severing means is a cutter and is mounted upon the lay and I employ such cutter shown to sever both the old and the new filling, although as previously stated, in certain embodiments of my invention the same filling parting means or cutter need not be employed to sever both fillings, nor need it be mounted upon the lay. The said cutter is preferably mounted at the rear of the reed or at the rear of the plane of the front face of the reed, and in operation is projected through an opening of the reed into the path of the filling to be severed. If located beyond the end of the reed, the cutter operates past such end or transversely thereof. In order to accomplish this result, I provide a cutter carrier 47, pivotally mounted at 48 upon the lay, and preferably at the rear face thereof upon a bracket 35² to be more fully described. At or near the upper end of the cutter carrier are provided two cutting blades or jaws 49, preferably essentially parallel and preferably of spring metal. I preferably incline slightly upwardly and inwardly or toward each other the cutting edges of these knives, as indicated at 49'. Mounted to coöperate with said cutting blades or jaws 49 is a lower blade or jaw 43, carried at or near the upper end of a rod or slide 41, preferably having an enlargement 42 at the lower end thereof. In the upward movement of said cutter or jaw 43, as will be described, said jaw tends to slightly further separate or force apart the jaws 49 and in so doing secures an effective cut. If desired, one of the jaws 49 may be replaced by a guide to hold the remaining upper cutting jaw in correct position. While I have described the cutting edges of the jaws 49 as preferably inclined upwardly, I may instead incline upwardly or downwardly the cutting edge of the jaw 43 or I may, if desired, provide flat cutting edges although the same would not be as effective as the described construction. Whether one or two upper cutting jaws be provided, I may deflect or incline inwardly the upper cutting jaw or jaws so that the same overlaps the lower blade or jaw at the period of contact with each other. Upon the upper end of the rod or slide 41 is provided a pin 44, and upon the cutter carrier 47 is a pin 46. To these pins is attached the coil spring 45, the tendency of which is to hold the rod or slide 41 in its lowered position and hence to hold the cutter jaw 43 in its lower or non-cutting position. Preferably upon the under side of the lay is mounted by a screw 35', a bracket 35², carrying a pivot 35, whereon is mounted a lever 34 which I have here shown as a cam lever and, for convenience of description, have so defined it, although it is to be understood that the said lever need not have a cam portion thereon, and other operating means may be substituted for said lever. Said cam lever 34 is connected by a pin 37 passing through a hub 36 thereon, with a sleeve 38 adapted to slide upon the extension or lower end 39 of the slide or rod 41. Said extension 39 has threaded upon its lower end the nut 40. Owing to the relative location of the pivot 35 of the cam lever, the pivot 48 of the cutter carrier and the connection between the cam lever and the rod or slide of the cutter blade or jaw 43, it will be observed that upon the forward motion of the lay the arm 32 of the primary lever 28 will impinge against said cam lever 34 at a point somewhat forward or to the left of the point of contact shown in Fig. 7 and will move said cam lever 34 upwardly upon its pivot, thereby sliding said sleeve 38 upwardly upon the extension 39 and at the same time swinging the cutter carrier forward upon its pivot 48, so as to project the jaws of the cutter through the opening of the reed as shown in said Fig. 7. The said upward movement of the cam lever 34 brings the sleeve 38 into contact with the enlargement 42 upon the slide 41 and thereupon the jaw 43 is brought into cutting relation with the upper jaws 49 as shown in Fig. 9. Said jaws 49 are preferably mounted as by a pin 50 upon a projection at the upper end of the cutter carrier, as indicated in said Fig. 9.

The cam lever 34 is preferably normally held depressed by the action of a coil spring 56, one end of which is secured in the bearing 57, and the other end of which is secured in the hub 58, fast upon a shaft 35, to which the hub of the cam lever 34 is pinned, as shown in Fig. 10. If preferred, the weight of the parts may be relied upon to restore them to normal position.

Assuming substantial exhaustion to have been indicated at the side of the loom opposite the replenishing mechanism, the transfer shaft 27 will be rocked and essentially upon the completion of the ensuing forward motion of the lay, the transfer will take place by the ejection of the spent bobbin and the substitution therefor of a filled bobbin. In order to insure the correct operation of the parts, it is desirable that the filling contained upon the bobbin to be ejected should be severed by the cutter prior to the actual transfer, that is, upon the same forward motion of the lay when the transfer occurs and preceding the actual transfer, so that when the transfer takes place and the old bobbin is ejected the filling thereof will be already severed and therefore such severed end may be withdrawn by the bobbin from the loom. I am not, however, to be limited to such period of severance of the old filling. I have so connected the cutter shown by me as that such described operation takes place.

I will now describe the means for severing the new filling. I have provided an auxiliary weft fork 24 (see Fig. 3) that is a weft fork (or its equivalent) preferably upon the replenishing side of the loom, coöperating with the grid 23 and it will be apparent that upon the described forward motion of the lay, the old filling having been severed by the cutter at the selvage, on the replenishing side there will be presented to the said auxiliary fork at such forward movement of the lay, no filling. The result will be that said fork will not be tilted as in the normal operation of the loom at each alternate forward movement of the lay, and therefore the rear end or loop of the said fork will not be lifted out of engagement with a hook 17″ of the weft hammer 17′. Therefore, in the further operation of the loom the weft fork slide will be moved and will impinge upon the upper end of the transfer lever 26, upon the transfer shaft 27, at the replenishment side of the loom, to thereby rock said shaft and again lift the primary lever 28 for the cutter so that upon the next forward movement of the lay the arm 32 of such lever will again be in position to operate the cam lever 34 to again project the cutter within the path of the filling and to operate said cutter upon such forward movement of the lay. At said forward movement of the lay the shuttle containing the new bobbin will have been thrown to the opposite box or that upon the indicating side of the loom and hence one pick of filling from the new bobbin will have been laid in the shed, such filling extending from the spindle of the hopper, past the notch upon the hopper body, and thence to the thread guide or holder and then to the selvage and within the path of the cutter when the second time projected through the reed as described. In this manner the new filling will be severed at the selvage. Whenever filling is severed, whether new or old, a short piece thereof as indicated at 77 in Fig. 4 is cut by the action of the jaws and is subsequently discharged. In using the term "auxiliary weft fork" I mean simply a device upon the replenishing side of the loom to detect the presence or absence of filling and it has no necessary connection with the weft fork upon the other side of the loom, if such be employed.

It will be apparent from the foregoing that when the filling is severed it is nearly at the completion of the forward movement of the lay, and that therefore such filling is held between the nearly closed upper and lower shades of the shed, and just in front of the reed, so that the said filling cannot escape the action of the filling severing mechanism.

At 74, in Fig. 2, I have indicated the old filling and at 75, in Fig. 3, the new, the filling 76 in Fig. 4 being either the new or old. At 53 is indicated the woven cloth and at 51 and 52 the upper and lower shades respectively of the shed.

At 59 I have indicated the shuttle feeler, the function of which is, as well-known, to determine whether the shuttle is properly positioned in the box and, if not, to prevent replenishment. It sometimes occurs that, although the shuttle is not quite correctly boxed, the shuttle feeler will work past the tip of the shuttle inasmuch as the motion of the feeler being normal to the axis of the shuttle and hence encountering the curved nose thereof, it acts to force its way past the same and cut the filling although no replenishment occurs. In order to avoid this result, I mount the shuttle feeler so that the same travels in a plane inclined to the path of travel of the shuttle when in running position, as shown in Fig. 3. The shuttle feeler is pivoted at 62 and has thereon a pin 86 beneath which engages an arm 87, hung at 88 upon the transfer lever 26. Said arm 87 is provided at the rear end with a hook, with which is engaged a spring 89, suitably connected at its other end to any convenient part of the loom so that when the contact face of the shuttle feeler encounters the shuttle when not properly boxed, the lever 26 is prevented from fully rising, thereby preventing replenishment. Carried upon the shuttle feeler is an arm 91, extending toward one side of the loom as shown in Fig. 3, and coöperating in the well-known manner with a pin 92 upon the dagger to, when necessary, place said dagger in such position relative to the bunter 85 on the lay (see Fig. 14) that the replenishment may not occur unless the shuttle is properly boxed.

Although cutters have been devised to sever the old filling that is to be ejected, it not infrequently happens that, while the nearly empty bobbin is ejected from the loom, the severed end of such old filling will not be withdrawn entirely from the shuttle or loom by the bobbin, but will be clamped between the side of the shuttle and the side of the shuttle box or shuttle binder and hence will not be withdrawn from the eye of the shuttle. If, therefore, such clamped end of the old filling (being still retained in the shuttle eye) retains an unbroken connection with the remnant of filling left upon the ejected bobbin, when the shuttle is replenished with a filled bobbin and is picked to the opposite side of the loom, there will be drawn into the shed not only the new filling but also the remnant of the old filling or a portion thereof, because the same was not withdrawn from the shuttle eye, although severed, thus forming a double pick. Thus, if the ejected bobbin has considerable filling thereon, and this filling is not snapped between the shuttle eye and the ejected bobbin as it is thrown into the can, then an entire pick of old filling will be drawn into the shed, to form a double pick if such old filling be caught between the shuttle and the box or binder. If, however, the old filling be so clamped between the shuttle and the box or binder and is snapped between the shuttle eye and the ejected bobbin in the can, then a trailing end (being an incomplete pick) is drawn into the shed with the pick of new filling. It will thus be seen that although cutters have been devised to sever the old filling, yet not infrequently such old filling was immediately after, and upon the next pick, again carried into the shed. It has been largely supposed that the carrying of the old filling again into the shed was due to the fact that the cutter had failed to operate and that the old filling had not been severed, but I have discovered that the true reason is that the end of the filling is as described caught, usually between the shuttle and the shuttle wall, and again carried into the shed. In order to prevent this occurrence I have cut away a portion of the front wall of the shuttle box, as shown at Fig. 14, (which may or may not be provided with a leather or other lining) such cut away portion extending along such part of the shuttle box wall as encounters the shuttle, or preferably from about the eye of the shuttle back to about its center, assuming the shuttle to have been properly boxed, and also preferably at the lower portion of such wall, inasmuch as I have found that it is at such point that the end of the filling is apt to be caught and clamped. With this construction the severed end of the filling is permitted to escape from the shuttle with the ejected bobbin.

In Fig. 14 I have shown the binder at the rear of the box. Certain looms are provided with binders at the front of the box and in such instances I recess a portion of the binder for the same purpose as shown in Fig. 15. I may employ any desired type of binder. If in any manner, or at any time, the old filling, after being cut, is caught between the bottom of the shuttle and the box plate, or elsewhere, and thereafter is drawn into the shed with the new filling, both the new and the old filling will be simultaneously cut by the cutter. Heretofore, so far as I am aware, no provision has been made for guiding the new filling between the replenishing mechanism and the selvage of the fabric. It frequently, therefore, happens that such new filling is drawn into the box or into the path of operating parts of the loom and is broken. To avoid this, I have mounted, preferably upon the forward portion of the shuttle box wall or binder, a guide 65, having a cam face 65' and having a recess 67 therein, into which the new filling will be drawn upon the first pick after replenishment from the weft replenishing side and thereby is guided along the upper edge of the shuttle feeler so that the filling cannot be broken by the shuttle feeler. The filling is thus kept out of the box and out of the way of the operating parts outside the box and is guided or held in position to be cut. Said guide may be secured upon the shuttle wall in any desired position by the screw 66.

The shuttle feeler 59 is, as indicated in Fig. 13, rounded at the upper and lower portions of its forward end so that in the forward movement thereof to feel for the shuttle, the same will pass over the old filling and under the new filling and not interfere therewith.

Having thus described my invention and one embodiment thereof, I desire to state that the terms employed by me are used in their general sense and not in their specific nature and that I am in no wise to be limited by such language but that the scope of my invention is set forth in the claims, as follows:

1. In a loom, weaving instrumentalities including filling replenishing mechanism and means mounted upon the lay to sever the filling to be ejected while the said filling is in its normal path.

2. In a loom, weaving instrumentalities, including filling replenishing mechanism, and means mounted upon the lay at the rear of the reed to sever the filling to be ejected while the filling is in its normal path.

3. In a loom, weaving instrumentalities including filling replenishing mechanism, and means mounted upon the lay at the rear of the path of travel of the shuttle, to sever the filling to be ejected immediately upon engagement of the filling and the severing means and while the same is in its normal path.

4. In a loom, weaving instrumentalities including filling replenishing mechanism, and means carried by the lay to sever between the reed and the fell of the cloth, the filling to be ejected while the same is in its normal path.

5. In a loom, weaving instrumentalities including filling replenishing mechanism, and means carried by the lay to sever the filling to be ejected, during the closing of the shed while the same is in its normal path.

6. In a loom, weaving instrumentalities including filling replenishing mechanism, a lay having a reed, and means to sever the filling to be ejected during the contact of the reed with the filling and while the filling is in its normal path.

7. In a loom, weaving instrumentalities including filling replenishing mechanism, a cutter carried by the lay, and means to operate the same to cut at the selvage and just prior to the discharge of the filling carrier the filling to be ejected and while the filling is in its normal path, so as to leave substantially no exposed ends.

8. In a loom, weaving instrumentalities including filling replenishing mechanism, means to indicate substantial exhaustion of the filling and thereupon to operate the filling replenishing mechanism, a cutter mounted upon the lay, and in its inoperative position having its forward portion substantially in the plane of the reed, and means to operate said cutter to cut the filling while the same is in its normal path.

9. In a loom, weaving instrumentalities including filling replenishing mechanism, means to indicate substantial exhaustion of the filling and thereupon to operate the filling replenishing mechanism, a cutter carried by the lay at the rear of the path of travel of the shuttle and comprising a fixed blade and a blade movable relatively thereto, means to project said blades into effective cutting position, and means to impart relative movement to said blades.

10. In a loom, weaving instrumentalities including filling severing means mounted at the rear of the path of travel of the shuttle, and means horizontally to project the same to sever the filling upon such movement of projection.

11. In a loom, weaving instrumentalities including filling severing means at the rear of the fell of the cloth, and means horizontally to project the same to sever the filling, said means comprising a plurality of contacting, sharpened blades 12. In a loom, weaving instrumentalities including filling replenishing mechanism, a cutter carrier pivoted upon the lay at the rear of the path of travel of the shuttle, cutter blades carried thereby and having movement relative to each other, and means to simultaneously move said carrier upon its pivot and to impart relative movement to said blades.

13. In a loom, weaving instrumentalities including filling replenishing mechanism, a cutter carrier pivoted upon the lay and provided with cutter blades having capacity for relative movement with respect to each other and operative connections to rock said carrier and operate said blades from the filling replenishing mechanism.

14. In a loom, weaving instrumentalities including a lay, a cutter carrier pivoted thereon, cutter blades carried thereby and having capacity for relative movement with respect to each other, and means to rock said carrier and to impart cutting movement to said blades.

15. In a loom, weaving instrumentalities including filling replenishing mechanism having a transfer shaft, a cutter carrier pivoted upon the lay, a cutter slidable therein, a lever pivoted upon the lay and operatively connected to said cutter, and operative connections between said transfer shaft and said lever whereby the cutter carrier will be rocked and the cutter operated to cut.

16. In a loom, weaving instrumentalities including filling replenishing mechanism having a transfer shaft, a cutter mounted upon the lay at the rear of the path of travel of the shuttle, and operative connections between the same and the transfer shaft to project the cutter into the path of the filling and to actuate the cutter to cut the filling while the same is in its normal path.

17. In a loom, weaving instrumentalities including filling replenishing mechanism having a transfer shaft, a cutter pivoted upon the lay at the rear of the reed, a cam lever pivoted upon the lay and operatively connected to said cutter to project the same into cutting position and to operate the same to cut, and operative connections between said transfer shaft and said cam lever.

18. In a loom, a filling cutter comprising a cutter carrier pivoted upon the lay at the rear of the path of travel of the shuttle, a cutter blade slidable in said carrier, a cam lever to rock said carrier and to simultaneously slide said cutting blade therein, and means to operate said cam lever.

19. In a loom, weaving instrumentalities including a lay, a cutter carrier pivoted thereon at the rear of the path of travel of the shuttle, a cutter blade fixed upon said carrier, a coöperating cutter blade having sliding movement upon said carrier, a lever mounted upon the lay, and mechanism to operate said lever to rock said cutter carrier and to operate said slidable cutter blade.

20. In a loom, weaving instrumentalities including a lay, a cutter carrier pivoted thereon at the rear of the path of travel of the shuttle, a fixed blade thereon, a coöperating blade slidable with respect to the carrier, and means to simultaneously slide said cutter blade and project both blades into the path of the filling to be cut.

21. In a loom, weaving instrumentalities including a filling cutter comprising two blades having capacity for relative sliding movement, the cutting edge of one of said blades being inclined with respect to the other.

22. In a loom, weaving instrumentalities including a filling cutter comprising two substantially parallel separated blades, a blade having capacity for movement relative thereto, and between said blades, said blades having cutting edges inclined with relation to each other so that the cutting edges of the parallel blades overlaps the cutting edges of the co-acting blades at the period of contact.

23. In a loom, weaving instrumentalities including filling replenishing mechanism, a cutter mounted upon the lay and comprising co-acting cutting blades, and means to operate the same to cut the filling to be ejected and thereafter to operate the same to cut the new filling.

24. In a loom, weaving instrumentalities including filling replenishing mechanism, a cutter carried by the lay, and means to operate the same during the forward movement of the lay to cut the filling to be ejected while the same is in its normal path and thereafter to cut the new filling.

25. In a loom, weaving instrumentalities including filling replenishing mechanism, thread severing means carried by the lay, and means to operate the same to sever without displacement the filling to be ejected and to thereafter sever the new filling.

26. In a loom, weaving instrumentalities including filling replenishing mechanism, a cutter carried by the lay and operative during the forward movement thereof to sever the filling to be ejected while the same is in its normal path and operative upon the next forward movement of the lay to sever the new filling.

27. In a loom, weaving instrumentalities including filling replenishing mechanism, a cutter carried by the lay and comprising co-acting cutting blades, operative connections between the cutter and the filling replenishing mechanism to sever the filling to be ejected and means co-acting with said cutting blades to effect severance of the new filling upon the next forward movement of the lay.

28. In a loom, weaving instrumentalities including a weft fork and an auxiliary weft fork at the opposite ends of the lay, filling replenishing mechanism having a transfer shaft, a cutter mounted upon the lay, operative connections between the same and the transfer shaft to sever the filling to be ejected during that forward movement of the lay upon which replenishment occurs, and operative connections between the auxiliary weft fork and the cutter to sever the new filling upon the succeeding forward movement of the lay.

29. In a loom, weaving instrumentalities including filling replenishing mechanism, a cutter carried by the lay at the rear of the path of travel of the shuttle, operative connections to project said cutter into the path of the filling and to operate the same to cut during that forward movement of the lay upon which replenishment occurs and means to operate said cutter to cut the new filling upon the next forward movement of the lay.

30. In a loom, weaving instrumentalities including filling replenishing mechanism having a transfer shaft, a cutter carried by the lay and adapted to be mounted thereon at the desired position lengthwise thereof, and operative means for said cutter mounted upon the transfer shaft and adjustable thereon into corresponding position with the cutter upon the lay, said operative means operating the cutter to sever the old and new filling.

31. In a loom, weaving instrumentalities including filling replenishing mechanism having a transfer shaft, a cutter upon the lay, a lever thereon to operate the same, said lever and cutter being adjustable to any desired position longitudinally of the lay, and a lever upon the transfer shaft adapted to be brought into coöperating relation with said lever upon the lay, said lever upon the transfer shaft being adjustable longitudinally thereon.

32. In a loom, weaving instrumentalities including filling replenishing mechanism, means carried at each end of the lay to indicate filling failure, means to indicate substantial exhaustion of the filling and to thereupon operate the filling replenishing mechanism, and a cutter carried upon the lay to sever the filling to be ejected during that forward movement of the lay upon which replenishment occurs and operative connections between the cutter and the means to indicate filling failure which is mounted upon that side of the loom at which replenishment occurs, to thereby operate the cutter to sever the new filling upon the succeeding forward movement of the lay.

33. In a loom, weaving instrumentalities including filling replenishing mechanism, means at that side of the loom at which replenishment occurs to indicate filling failure, means to sever the filling, and operative connections between said means and the means to indicate filling failure.

34. In a loom, weaving instrumentalities including filling replenishing mechanism, means upon that side of the loom where replenishment occurs to indicate filling failure, and a cutter operative through the absence of the old filling owing to the ejection thereof to sever the new filling after only one pick thereof has been laid.

35. In a loom, weaving instrumentalities including filling replenishing mechanism, means upon that side of the loom where replenishment occurs to indicate the absence of filling owing to the ejection thereof at replenishment, a cutter carried by the lay and operative connections between the same and said means for indicating filling failure to sever the new filling.

36. In a loom, weaving instrumentalities including filling replenishing mechanism, means to sever to new filling immediately after one pick thereof has been laid, said cutter being rendered operative by the absence after severance thereof, of the filling to be ejected.

37. In a loom, weaving instrumentalities including filling replenishing mechanism, a cutter carried by the lay and comprising co-acting cutting blades, operative connections between said cutter and the filling replenishing mechanism to operate the same prior to the completion of that forward movement of the lay at which replenishment occurs and means to operate said cutter to sever the new filling during the next forward movement of the lay.

38. In a loom, weaving instrumentalities including filling replenishing mechanism, means for operating said replenishing mechanism at substantial exhaustion of the filling, a cutter carried by the lay and comprising co-acting cutting blades, operative connections from the same to the replenishing mechanism to cut the old filling during that forward movement of the lay upon which replenishment occurs and means to operate said cutter to cut the new filling when less than two picks thereof have been laid.

39. In a loom, weaving instrumentalities including filling replenishing mechanism, and guiding means for the thread between the replenishing means and the selvage, upon that side of the loom where replenishment occurs to retain the thread during the backward and forward movement of the lay.

40. In a loom, weaving instrumentalities including filling replenishing mechanism having a hopper, and guiding means for the thread between the hopper and the selvage of the fabric upon that side where replenishment occurs and into which the thread is deposited while being picked.

41. In a loom, weaving instrumentalities including filling replenishing mechanism having a rotating hopper, and guiding means for the thread between the hopper and the selvage of the fabric upon that side where replenishment occurs to retain the thread during the forward and backward movement of the lay.

42. In a loom, weaving instrumentalities including filling replenishing mechanism, and an open guide for the thread upon the shuttle box into which the new thread is deposited as it is picked.

43. In a loom, weaving instrumentalities including filling replenishing mechanism, and an open guide between said mechanism and the selvage into which the new thread may be drawn while being picked upon the first pick after replenishment.

44. In a loom, weaving instrumentalities including filling replenishing mechanism, means upon the shuttle box to guide the new thread into proper position to be severed and severing means moving with the lay.

45. In a loom, weaving instrumentalities including filling replenishing mechanism, and means distinct from the replenishing mechanism to confine and guide the new thread while being picked.

46. In a loom, weaving instrumentalities including filling replenishing mechanism, and means distinct from the replenishing mechanism to guide the new thread into position to be severed, and thread severing means moving with the lay.

47. In a loom, weaving instrumentalities including filling replenishing mechanism, and provisions for facilitating the escape of the old filling by draft of its carrier from the shuttle upon the ejection of the filling carrier.

48. In a loom, weaving instrumentalities including replenishing mechanism, and means to facilitate the withdrawal of the end of the ejected filling by the ejected carrier, thereby preventing it from being retained in the shuttle after the ejection of the filling carrier.

49. In a loom, weaving instrumentalities including filling replenishing mechanism, thread severing means, comprising a pair of relatively movable blades and a guide between said mechanism and the selvage to guide the new filling into position to be severed.

50. In a loom, weaving instrumentalities including filling replenishing mechanism, and means to facilitate the withdrawal of the end of the ejected filling by the ejected carrier, thereby preventing it from being retained in the eye of the running shuttle, after the ejection of the filling carrier.

51. In a loom, weaving instrumentalities including filling replenishing mechanism, a cutter to sever the filling to be ejected, and means to facilitate the withdrawal of the end of the severed filling by the ejected carrier, thereby preventing it, after the same has been severed, from being retained in the running shuttle after the ejection of the filling carrier.

52. In a loom, weaving instrumentalities including filling replenishing mechanism, means to sever the old filling upon replenishment, and means to permit the severed end of the filling and the carrier therefor to be withdrawn from operative relation with the shuttle by draft of its carrier.

53. In a loom, weaving instrumentalities including filling replenishing mechanism, means to sever the old filling upon replenishment, and means to permit the severed end of the old filling to be withdrawn by the ejected carrier from operative relation with the shuttle.

54. In a loom, weaving instrumentalities including filling replenishing mechanism, means to sever the old filling upon replenishment and means to prevent binding of the old filling between the surface of the shuttle and an opposed wall of the shuttle receiving means.

55. In a loom, weaving instrumentalities including filling replenishing mechanism, and a shuttle box having an inner wall thereof recessed so as to permit the severed end of the old filling to be withdrawn from operative position with the ejection of the filling carrier.

56. In a loom, a cutter for the filling comprising two cutting members, one at least of said members being of spring metal, said members lying in planes inclined toward each other, so that in the cutting action the edges of said members are inclined with respect to each other.

57. In a loom, a cutter for the filling comprising a jaw and two opposing jaws of spring material, the cutting edges of a pair of said jaws being inclined with respect to each other.

58. In a loom, a filling cutter comprising a jaw and two opposing jaws relatively movable with respect to the first jaw and between which said first jaw operates, the cutting edges of a pair of said jaws being inclined with respect to each other.

59. In a loom, a cutter for the filling comprising two substantially parallel jaws of spring material, an opposing jaw, and means to reciprocate said opposing jaw between said substantially parallel jaws, the cutting edges of a pair of said jaws being inclined with respect to each other.

60. In a loom, a filling cutter comprising two substantially parallel separated cutting jaws, an opposing jaw relatively movable with respect to and between said jaws, and adapted in such relative movement to further separate said substantially parallel jaws.

61. In a loom, weaving instrumentalities including filling replenishing mechanism, old and new filling severing mechanism, and coöperating means rendering the severance of the new filling dependent upon the severance of the old filling.

62. In a loom, weaving instrumentalities, including filling replenishing mechanism, a thread parting device, means to operate the same to sever the filling to be ejected, means operative upon the severance of such filling, and connections therefrom to the said thread parting device to sever the new filling.

63. In a loom, weaving instrumentalities including filling replenishing mechanism, filling severing mechanism and coöperating means rendering the filling severing mechanism operative to sever the new filling upon the severance of the old filling.

64. In a loom, weaving instrumentalities including filling replenishing mechanism, thread parting mechanism, means to operate the same to sever the filling to be ejected, and means to detect the severance thereof, and upon such detection to render the thread parting mechanism effective to sever the new filling.

65. In a loom, weaving instrumentalities including filling replenishing mechanism, thread parting mechanism, means to operate the same to sever the filling to be ejected, and means to detect such severance and upon detection thereof, to render the thread parting mechanism effective to sever the new filling when only one pick thereof has been laid.

66. In a loom, weaving instrumentalities including filling replenishing mechanism, thread parting mechanism, means to operate the same upon the forward movement of the lay to sever the filling to be ejected, means to detect such severance and upon detection thereof to render the thread parting mechanism effective to sever the new filling upon a succeeding forward movement of the lay.

67. In a loom, weaving instrumentalities including filling replenishing mechanism, filling severing means having provisions to sever the filling to be ejected, upon the forward movement of the lay, and means to detect such severance and upon detection thereof to render the filling severing means operative to sever the new filling upon the next forward movement of the lay.

68. In a loom, weaving instrumentalities including filling replenishing mechanism, a thread parting device, means to operate the same to sever the old filling upon replenishment, means to detect such severance, and connections controlled by such detecting means to operate the thread parting device to sever the new filling.

69. In a loom, weaving instrumentalities including filling replenishing mechanism, thread parting mechanism to sever the old filling upon replenishment and to sever the new filling and coöperating means to render the severance of the new filling dependent upon the severance of the old filling.

70. In a loom, weaving instrumentalities including filling replenishing mechanism, thread parting mechanism to sever the old filling upon replenishment and to sever the new filling, a weft fork and connections therefrom to render the thread parting mechanism effective to sever the new filling.

71. In a loom, weaving instrumentalities including filling replenishing mechanism, thread parting mechanism to sever the old filling upon replenishment and to sever the new filling, a weft fork upon that side of the loom where replenishment occurs, and means operated by said weft fork rendering the severance of the new filling dependent upon the severance of the old filling.

72. In a loom, a cutter for the filling comprising two substantially parallel jaws of spring material and an opposing jaw received between said parallel jaws during the severing action, whereby each of said spring jaws tends to hold the other jaw against the opposing severing blade.

73. In a loom, weaving instrumentalities including a filling cutter comprising three blades having capacity for relative movement, the cutting edge of two of said blades being inclined with respect to the remaining blade.

74. In a loom, weaving instrumentalities including filling replenishing mechanism, means to indicate substantial exhaustion of the filling and thereupon to operate the filling replenishing mechanism, and a filling cutter comprising a plurality of blades having capacity for relative movement, the cutting edge of one of said blades being inclined with respect to the other.

75. In a loom, weaving instrumentalities including filling replenishing mechanism, and means distinct from the replenishing mechanism to guide the new thread while being picked and hold it in position to be cut.

76. In a loom, weaving instrumentalities including filling replenishing mechanism, a cutter mounted upon the lay at the rear of the reed and having a forward motion, and means to operate the same to sever upon the forward movement of such cutter the filling to be ejected, said cutter comprising contacting, coöperating blades.

77. In a loom, weaving instrumentalities including filling replenishing mechanism, means mounted upon the lay at the rear of the path of travel of the shuttle to sever without deflection thereof the filling to be ejected and having a forward movement upon the lay, and means whereby said filling is severed upon the forward motion of said severing means.

78. In a loom, weaving instrumentalities including filling replenishing mechanism, means mounted upon the lay to sever the filling to be ejected prior to the ejection of the filling carrier and having a bodily forward movement upon the lay, and means to operate said severing means to sever the filling upon the forward motion of such severing means.

79. In a loom, weaving instrumentalities including filling replenishing mechanism, and blades mounted upon the lay to sever the filling to be ejected during the forward motion of the lay and having a forward movement upon the lay, said blades being maintained in substantial parallelism.

80. In a loom, weaving instrumentalities including filling replenishing mechanism, and blades carried by the lay to sever between the reed and fell of the cloth the filling to be ejected, said blades being maintained in substantial parallelism.

81. In a loom, weaving instrumentalities including filling replenishing mechanism, a lay having a reed, and blades arranged in substantial parallelism, and means to actuate the same to sever the filling to be ejected during the contact of the reed with the filling.

82. In a loom, weaving instrumentalities including filling replenishing mechanism, a lay having a reed, and blades carried by the lay to sever the filling to be ejected during the contact of the reed with the filling, said blades being arranged to overlap.

83. In a loom, weaving instrumentalities including filling replenishing mechanism, a cutter mounted upon the lay comprising substantially parallel contacting blades and operative connections between the same and the filling replenishing mechanism.

84. In a loom, weaving instrumentalities including filling replenishing mechanism, a cutter mounted upon the lay to sever the filling to be ejected, such cutter having a forward movement upon the lay, and operative connections from the filling replenishing mechanism to project the cutter in effective operative position and to actuate the cutter to cut upon such movement of projection.

85. In a loom, weaving instrumentalities including a lay, thread severing means mounted thereon at the rear of the path of travel of the shuttle, means operated by the forward movement of the lay to project said severing means into the path of the filling to sever the same, said severing means being operative to sever the thread upon such movement of projection, and means to retract the severing means after its severing action.

86. In a loom, weaving instrumentalities including filling severing means mounted at the rear of the path of travel of the shuttle, said severing means having a forward movement upon its support, and means horizontally to project said severing means to sever the filling upon such movement of projection.

87. In a loom, weaving instrumentalities including filling severing means at the rear of the fell of the cloth and comprising substantially parallel blades, and means to project the same to sever the old filling.

88. In a loom, weaving instrumentalities including filling replenishing mechanism, a cutter mounted upon the lay, such cutter having a forward movement thereon. means to operate the cutter to cut the filling to be ejected during a forward movement of such cutter upon the lay, and means thereafter to operate the cutter to cut the new filling.

89. In a loom, weaving instrumentalities including filling replenishing mechanism, a cutter carried by the lay and having a forward movement thereon, means to operate such cutter during the forward movement of the lay and during the forward movement of the cutter upon the lay to sever the filling to be ejected, and means to operate the cutter upon the next forward movement of the lay to sever the new filling.

90. In a loom, weaving instrumentalities including filling replenishing mechanism, a cutter carried by the lay and having a forward movement thereon, operative connections between the cutter and the filling replenishing mechanism to operate the same prior to the completion of that forward movement of the lay at which replenishment occurs and upon the forward movement of the cutter upon the lay, and means to operate said cutter to sever the new filling during the next forward movement of the lay.

91. In a loom, weaving instrumentalities including filling replenishing mechanism, a cutter carried by the lay and having a forward movement thereon, means for operating the cutter to sever the old filling when the same shall have become substantially exhausted and upon the forward movement of such cutter upon the lay, and means to sever the new filling when only one pick thereof has been laid.

92. In a loom, weaving instrumentalities including filling replenishing mechanism, means for operating said replenishing mechanism at substantial exhaustion of the filling, a cutter carried by the lay and having a forward movement thereon, operative connections from the same to the replenishing mechanism to cut the old filling during that forward movement of the lay upon which replenishment occurs and upon the forward movement of the cutter upon the lay, and means to operate said cutter to cut the new filling when less than two picks thereof have been laid.

93. In a loom, weaving instrumentalities including filling replenishing mechanism, a cutter carried by the lay and comprising substantially parallel co-acting blades, means for operating the same to sever the old filling when the same shall have become substantially exhausted, and operating connections, whereby the new filling is severed when only one pick thereof has been laid.

94. In a loom, weaving instrumentalities including filling replenishing mechanism, a cutter mounted upon the lay at the rear of the reed to sever the filling to be ejected, said cutter comprising a plurality of co-operating severing members having right line movement relative to each other adapted to engage the filling between them to sever the same, and means to impart movement to each of said members relatively to the lay to project them from the rear of the front face of the reed to a position in advance of such front face, thereby to sever the filling to be ejected.

95. In a loom, weaving instrumentalities including filling replenishing mechanism and cutting means to cut the filling to be ejected while said filling is in its normal path.

96. In a loom, weaving instrumentalities including filling replenishing mechanism, a cutter carried by the lay at the rear of the path of travel of the shuttle, means to project the cutter into the path of the filling to be ejected, and means to operate the cutter, thereby to sever the filling while the latter is in its normal path.

97. In a loom, weaving instrumentalities including filling replenishing mechanism, a cutter mounted upon the lay and operative connections between the same and the filling replenishing mechanism, whereby the filling is severed while the same is in its normal path.

98. In a loom, weaving instrumentalities including filling replenishing mechanism, a cutter mounted upon the lay, and means to operate the same to cut the filling to be ejected while the same is in its normal path and thereafter to operate said cutter to cut the new filling.

99. In a loom, weaving instrumentalities including filling replenishing mechanism, a cutter carried by the lay, and operative during the forward movement thereof to sever the filling to be ejected while the latter is in its normal path and operative upon the next forward movement of the lay to sever the new filling.

100. In a loom, weaving instrumentalities including filling replenishing mechanism, a cutter carried by the lay, operative connections between said cutter and the filling replenishing mechanism to operate the same prior to the completion of that forward movement of the lay at which replenishment occurs and means to operate said cutter to sever the new filling during the next forward movement of the lay.

101. In a loom, weaving instrumentalities including filling replenishing mechanism, a cutter carried by the lay, means for operating the same to sever the old filling when the same shall have become substantially exhausted, and means to sever the new filling when only one pick thereof has been laid.

In testimony whereof, I have signed my name to this specification, in the presence of two subscribing witnesses.

FRANCIS A. MILLS.

Witnesses:
IRVING U. TOWNSEND,
SIDNEY F. SMITH.